(12) United States Patent
Filreis et al.

(10) Patent No.: US 8,219,817 B2
(45) Date of Patent: Jul. 10, 2012

(54) SYSTEM AND METHOD FOR AUTHENTICATION OF TRANSFORMED DOCUMENTS

(75) Inventors: James Filreis, Framingham, MA (US); Eric Burger, Amherst, NH (US)

(73) Assignee: Dialogic Corporation, Montreal, Quebec (CA)

( * ) Notice: Subject to any disclaimer, the term of this patent is extended or adjusted under 35 U.S.C. 154(b) by 1205 days.

(21) Appl. No.: 11/598,495

(22) Filed: Nov. 13, 2006

(65) Prior Publication Data
US 2008/0016358 A1    Jan. 17, 2008

Related U.S. Application Data

(63) Continuation-in-part of application No. 11/484,066, filed on Jul. 11, 2006.

(51) Int. Cl.
*H04L 9/00* (2006.01)
(52) U.S. Cl. .................................. 713/176; 713/181
(58) Field of Classification Search ............... 713/176, 713/168, 181; 380/243
See application file for complete search history.

(56) References Cited

U.S. PATENT DOCUMENTS

| | | | |
|---|---|---|---|
| 5,530,755 A | 6/1996 | Pailles et al. | |
| 5,579,393 A | 11/1996 | Conner et al. | |
| 6,111,953 A | 8/2000 | Walker et al. | |
| 6,170,744 B1 | 1/2001 | Lee et al. | |
| 6,430,608 B1 | 8/2002 | Shaio | |
| 6,600,823 B1 * | 7/2003 | Hayosh | 380/51 |
| 6,757,827 B1 | 6/2004 | Geist | |
| 6,785,405 B2 | 8/2004 | Tuttle et al. | |
| 6,938,157 B2 | 8/2005 | Kaplan | |
| 7,007,303 B2 | 2/2006 | Goldberg et al. | |
| 7,051,206 B1 | 5/2006 | Giest et al. | |
| 7,080,041 B2 | 7/2006 | Nagel | |
| 2001/0021251 A1 * | 9/2001 | Kasai | 380/201 |
| 2002/0026583 A1 * | 2/2002 | Harrison et al. | 713/172 |
| 2004/0153452 A1 * | 8/2004 | Carro | 707/9 |
| 2005/0246541 A1 | 11/2005 | Ginter et al. | |
| 2009/0015876 A1 * | 1/2009 | Brown | 358/405 |

FOREIGN PATENT DOCUMENTS
WO   WO 2005060154 A1 *   6/2005

OTHER PUBLICATIONS

*Digital Image Processing*, Second Edition, Rafael C. Gonzalez and Richard E. Woods, Prentice Hall, copyright 2002.
*Measuring document image skew and orientation*, Dan S. Bloomberg, Gary E. Kopec and Lakshmi Dasari, IS&T/SPIE EI'95, Conference 2422: Document Recognition II, pp. 302-316, Feb. 6-7, 1995, San Jose, CA.

(Continued)

*Primary Examiner* — Samson Lemma
(74) *Attorney, Agent, or Firm* — Weingarten, Schurgin, Gagnebin & Lebovici LLP

(57) ABSTRACT

A document verification system and method verifies that a content of two documents match based on comparison of an authentication signature generated from each of the documents. The documents may be electronic text documents and may be transformed representations of each other through imaging, printing or image processing. Authentication signatures can be encrypted to enhance security and identify document sources. An authentication signature can be generated for an entirety or portions of the document. Multiple authentication signatures may be generated for each document for selected document regions. The authentication signature can be stored electronically or in hard copy and can be machine-readable to be automatically interpreted by a machine.

31 Claims, 8 Drawing Sheets

OTHER PUBLICATIONS

*Using statistical models in document images understanding*, LeBourgeois F., Souafi-Bensafi S., Duong J., Parizeau M., Cote M., Emptoz H., *Laboratoire Reconnaissance de Formes et Vision*.

*Restoring warped document images through 3D shape modeling*, Chew Lim Tan, Li Zhang, Zheng Zhang, Tao Xiz, Sch. of Comput., Nat. Univ. of Singapore, Singapore; *Pattern Analysis and Machine Intelligence*, Feb. 2006, vol. 28 Issue 2, pp. 195-208.

*An algorithm for the skew normalization of document image*, Nakano, Y., Shima, Y., Fujisawa, H., Higashino, J., Fujinawa, M., Shinshu Univ., Nagano, *Pattern Recognition, 1990. Proceedings., 10th International Conference*, Jun. 16-21, 1990, vol. ii, pp. 8-13, vol. 2.

Technology Solutions, Image Security, http://www.unisys.com/products/payment_systems/image_security.htm, p. 1, Unisys Corporation, Apr. 5, 2006.

Check Image Protection in the 21st Century, www.unisys.com, Unisys Corporation, 2004.

OCR: Print, http://cslu.cse.ogi.edu/HLTsurvey/ch2node5.html, Abdel Belaid, CRIN/CNRS & INRIA, Nancy, Lorraine, France.

Public-key Cryptography, http://en.wikipedia.org/wiki/Public-Key_cryptography.

Symmetric-key algorithm, http://en.wikipedia.org/wiki/Symmetric_key_algorithm.

\* cited by examiner

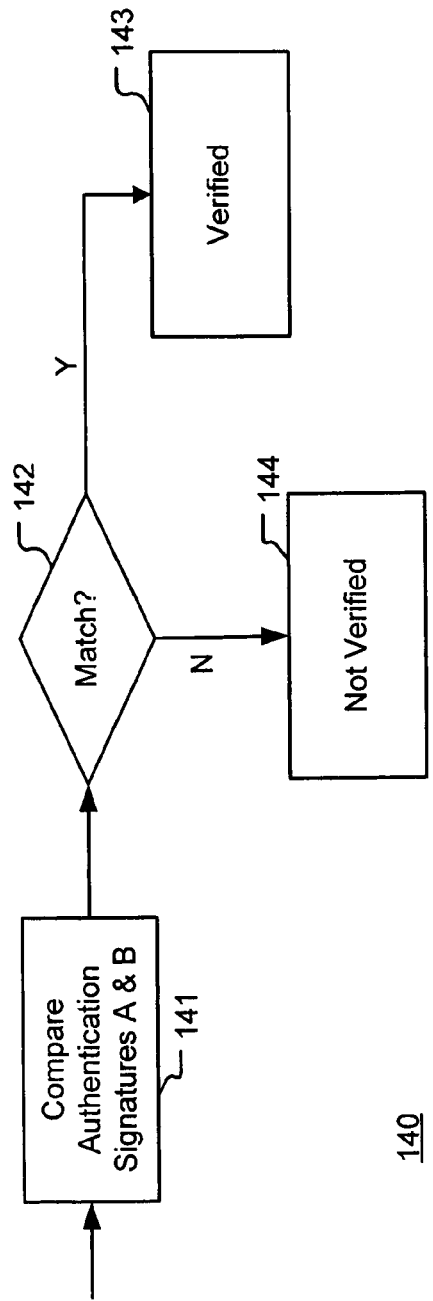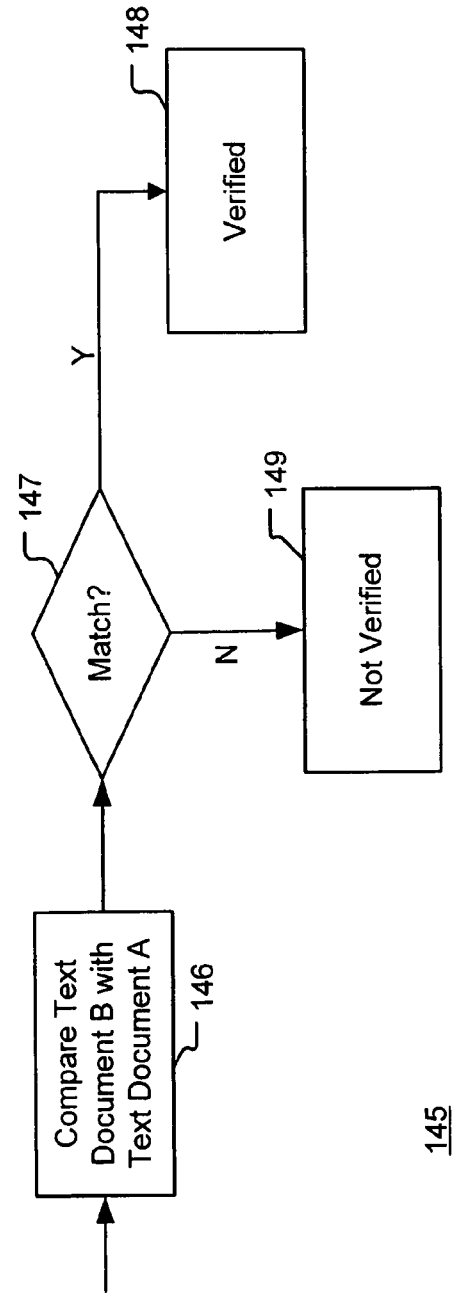

SYSTEM AND METHOD FOR AUTHENTICATION OF TRANSFORMED DOCUMENTS

CROSS REFERENCE TO RELATED APPLICATIONS

This is a continuation-in-part application of application Ser. No. 11/484,066, filed Jul. 11, 2006.

STATEMENT REGARDING FEDERALLY SPONSORED RESEARCH OR DEVELOPMENT

N/A

BACKGROUND OF THE INVENTION

1. Field of the Invention

The present invention relates generally to authentication of documents, and relates more particularly to authentication of information in a document that is transformed from an original text document into another representation.

2. Description of Related Art

Documents are often transformed into other representations such as by printing, scanning or transmission. The term document is used here to mean any electronic or hard copy representation, that contains or conveys information, with a content of text, symbols, graphics, images, formatting and so forth. Hard copy representations are meant to include paper and any other tangible medium in which content representations may be fixed. In the case of document transmission, transformation of the document often occurs as part of the transmission process, such as with transmission by facsimile or email. In such transmissions, the document may be transformed to an image or a text document. An image document generally refers to a representation of information suitable for display or transmission that is usually viewed as an image or picture. A text document generally refers to a representation of information with text characters, such as a document that includes ASCII type characters.

Documents are often secured from access or tampering. For example, during electronic transmission of a document, encryption is often used to provide an authentication technique where it is believed that only the sender is able to generate the content of a given communication. The sender encrypts the communication, for example, with a key that is part of a private/public key pair, and sends the encrypted information to the receiver over a communication link. The receiver decrypts the communication using the other part of the private/public key pair, and reviews the transmitted content. Sometimes an authentication code or element is transmitted with the communication, such as a checksum or time and date stamp. The private/public key pair code contribute to identifying the source and the code contributes to assuring the receiver that the received communication is authentic and the same as that transmitted by the sender. The same types of security may be applied to documents for storage or other applications not necessarily related to communication. The private/public key pair encryption is often referred to as asymmetric encryption, since the private key is a secret key, while the public key is generally available. Other types of encryption permit only the author and a limited number of trusted parties to access the content of a document. This type of encryption is often referred to as symmetric key encryption or shared secret key encryption.

Security for electronic documents is also an important issue that may involve authentication with regard to unauthorized copying. For example, an electronic document may be "watermarked" to provide a secure indication of information associated with the document. Such associated information can include the author, owner, time and date created, particular characteristics related to the document and so forth. The watermark is often not visible as part of the document, but is in the form of an electronic signature typically embedded in the data of the file containing the document. The watermarked image is static, in that it does not reflect any information associated with transformations of the document, as may occur when a document is printed, scanned, digitized, transmitted such as by facsimile, and so forth. Typically, an image watermark is used to secure intellectual property rights in the image, or provide evidentiary support for claims of authorship, ownership and the like. The watermark may include indicia related to securing or authenticating the document, such as a code or checksum that reflects the state of the document when the watermark was applied. The code or checksum can then be used to verify that the document did not change in content so that the document can be checked for tampering or modification.

Authentication may also be an issue involved in the comparison of two electronic copies of a document, for example. Typically, the electronic documents are compared on a unit-by-unit basis, such as byte by byte or word for word. This type of comparison and authentication typically assumes the two documents are in the same format and are generated by the same program or software. The authentication is conducted based on direct electronic comparisons between the documents. This type of comparison or authentication is specific to a particular format of document and does not relate to image inspection or authentication. In addition, this type of document authentication does not apply to transformed documents, including documents transformed and transmitted over a communication link. Moreover, this type of document authentication by comparison does not operate directly on hard copy documents or document images.

Another issue involving authentication of documents relates to transformation of a document from one format to another. If a document exists as an original in one format, and is then converted to another format due to transmission, scanning, printing and so forth, authentication of the transformed document may be difficult. For example, a printed document derived from an electronic text document is difficult to authenticate against the original document without resorting to manual techniques, such as by inspection of both document forms by a reviewer. It would be desirable to obtain a technique for being able to automatically compare a set of documents where one is a transformed version of the other.

SUMMARY

The present disclosure provides a system and method for authenticating document contents, based on a comparison between original and transformed versions of the document. The original document is provided in electronic form, from which an authentication signature is generated. The original document is usually formed as a text document; however, any type of information representation may be used. For example, the original document may include symbols that can be interpreted by a machine as text characters, such as ASCII codes, images of text characters, or barcode symbols. The symbols in the electronic document should be reproducible through one or more transformations, and continue to be recognizable and interpreted by a machine.

An original text document may be created in a number of ways, including through a word processor, a scanned image processed with an Optical Character Recognition (OCR) engine, or barcode reader, and so forth. An electronic text document includes text characters, such as ASCII encoded characters, and may further include other objects such as images, pictures, graphics, or other representations of information. The text may be represented by symbols or pictures as part of an image, picture, graphics or other representations of text. The original text document in electronic form is transformed by, for example, printing, conversion to an image, image printing, and so forth. Text characters may be transformed within the original text document from text character representations to image or graphic representations of text characters, and vice versa. For example, portions of an original text document may be transformed, such as from text characters to image representations, or image representations to text characters. The disclosed system and method provide for authentication of the transformed document through comparison with the original text document.

According to an exemplary embodiment of the present invention, there is provided a text document verification system and method that verifies that two text documents matched based on comparison of an authentication signature generated from each of the text documents. The text documents may be transformed representations of each other by imaging, printing or image processing. Authentication signatures can be encrypted to enhance security and identify sources of text documents. An authentication signature can be generated for an entirety or portions of the text document. Multiple authentication signatures may be generated for each text document for selected document regions. The authentication signature can be stored electronically or in hard copy and can be machine-readable to be automatically interpreted by a machine.

According to an exemplary embodiment, there is provided a method for verifying matching content between a plurality of text documents. The method includes forming a first authentication signature from content of a first text document. A second authentication signature is also formed from content of a second text document. The first and second authentication signatures are compared for a match.

According to an aspect of the invention, an image document is transformed to form one or more of the text documents. The authentication signatures may be formed by computing a checksum from one or more of the text documents. A plurality of authentication signatures can be formed for one or more of the text documents. One or more of the authentication signatures can be formed to be machine-readable. Security and identification of document source can be provided by encrypting one or more of the authentication signatures.

According to another exemplary embodiment, there is provided a system for verifying matching content between a plurality of text documents. The system can include a transformation mechanism for transforming an image document to a text document. The system may also include an authentication signature generator for generating an authentication signature from a text document. A comparator is provided for comparing authentication signatures for a match.

According to an aspect of the present invention, the system may provide a checksum generator for generating a checksum from one or more of the text documents to contribute to forming an authentication signature. An authentication signature reader can be provided for reading an authentication signature in machine-readable format. An encryption mechanism may also be used to encrypt/decrypt an authentication signature. The system may also include a storage device for storing one or more of the authentication signatures.

BRIEF DESCRIPTION OF THE SEVERAL VIEWS OF THE DRAWINGS

Features of the present invention are described in greater detail below in conjunction with the accompanying drawings, in which:

FIGS. 3a and 3b are flow diagrams illustrating verification processes;

DETAILED DESCRIPTION OF THE INVENTION

Figure 1:
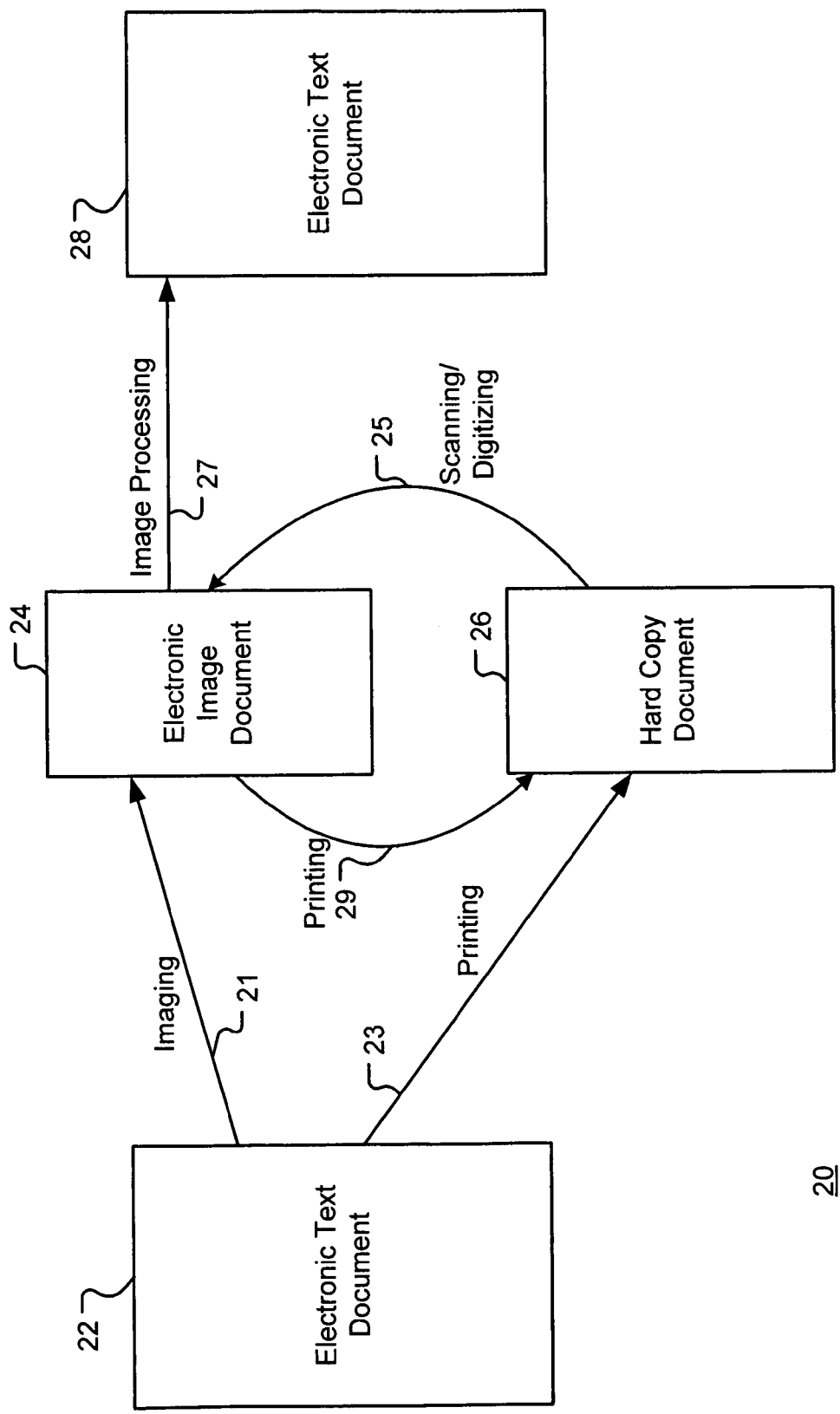
FIG. 1 is a block diagram illustrating document transformation paths.

This is a continuation-in-part application of application Ser. No. 11/484,066, filed Jul. 11, 2006, the entire content of which is hereby incorporated herein by reference.

The presently disclosed system and method provides for document authentication based on an original text document that is transformed to another document representation, and potentially modified. In accordance with one exemplary embodiment of the disclosed system and method, the transformed document is again transformed to another electronic representation through a secondary transformation and converted to a text document. The converted text document is then authenticated against the original text document. The first transformation from an electronic text document to another document representation may include imaging to create an electronic image document, and may include printing to form a hard copy paper representation of the document. The paper document can be scanned or digitized to form an electronic image document as part of the secondary transformation. An electronic image document, including those obtained by scanning or digitizing a paper document, is image processed to obtain an electronic text document, which then can be used in an authentication process with the original electronic text document.

Authentication of text documents may take place based on a direct comparison of electronic text documents. Alternately, or in addition, authentication of the electronic text documents may occur on the basis of an authentication signature derived from the original text document. The authentication signature uniquely identifies the desired content of the original electronic text document. The authentication signature should match an authentication signature generated from the resulting electronic text document that is generated from the transformation process.

The authentication signature may be in a machine-readable format, such as a standard type barcode. Various symbols or indicia may be used to form the authentication signature as well. For example, the authentication signature may be composed of two-dimensional barcodes, such as matrix or stacked barcodes, alphanumeric or other symbols or encoded symbols. The authentication signature should be available to a machine for interpretation, such as by being in electronic format, or capable of being placed in electronic format or representation to be readable by a machine. For example, the authentication signature may be in paper media that can be scanned and image processed to permit a machine to recognize the authentication signature. In an exemplary embodiment, the authentication signature is provided on a separate page from those encompassing the document. A document may have associated with it one or more pages that provide one or more authentication signatures. For example, each separate page may provide a portion, an entirety, or more than one authentication signature.

Encryption may be used to secure the original electronic text document or authentication signature. For example, private/public key pairs may be used for encrypting and decoding the authentication signature or original electronic text document. The authentication signature may be stored in electronic form or hard copy form, such as paper, whether in encrypted format or not. The stored authentication signature should be available for interpretation by machine as discussed above.

The system and method of the present disclosure is applicable to documents that undergo multiple transformations, and documents that may be intentionally modified. For example, authentication of a transformed document that is the result of multiple transformations may be achieved in accordance with the disclosed system and method. Intentional modifications may include such instances as modification of a document to indicate time and date of reception, as may occur in a facsimile transmission. Other intentional modifications may include the application of a hand signature to a document to provide manifestation of assent to the document contents or an agreement contained in the document. The portions of the document that are unmodified may be used as the source for the authentication process to verify the transformed document with the original.

A number of different techniques may be applied to transform an electronic image document to an electronic text document for the purposes of authentication and comparison. For example, image processing techniques, such as Optical Character Recognition (OCR), Exclusive OR Operations (XOR) and other symbol recognition or image processing technologies may be used. OCR techniques typically interpret an electronic image that is composed of text characters, and encode the interpreted characters in a standard format. For example, OCR techniques can interpret alphanumeric characters and produce corresponding ASCII codes for the characters. The ASCII codes may then be read by a word processing application, for example, to produce an electronic text document. Various techniques may be used to improve the image processing techniques, such as specifying or increasing character spacing to improve OCR results. Character spacing, or segmentation, can be applied to an electronic document prior to or after a transformation to improve results of applied OCR techniques. Similarly, other steps to improve symbol recognition by a machine can be employed prior to or after a transformation of a document that includes symbols to improve machine readability and symbol interpretation.

Referring now to FIG. 1, a diagram illustrating possible transformation paths is illustrated generally as diagram 20. An electronic text document 22 is illustrated as being transformed in two different ways, through imaging 21 or printing 23. The result of imaging electronic text document 22 is electronic image document 24. The result of printing electronic text document 22 is a hard copy document 26. Hard copy document 26 is typically a paper document that provides a hard copy representation of electronic text document 22. Electronic image document 24 may also be transformed to a hard copy document 26 through a printing operation 29. Hard copy document 26 may be transformed to an electronic image document 24 by a scanning/digitizing operation 25. In each instance of electronic image document 24 or hard copy document 26, the documents are transformed representations of the originating document, and may be the result of one or more transformations.

As an example of an application of the disclosed system and method, an electronic text document 22 is transformed to an electronic image document 24 by imaging 21. Electronic image document 24 is then transmitted in an electronic transmission, such as, for example, in an email message. The recipient of the emailed electronic image document 24 may print the document to form a hard copy document 26. Hard copy document 26 may be reviewed or modified, by hand signature or other manifestation of assent or acknowledgement. Hard copy document 26 is then transformed to electronic image document 24 by scanning/digitizing 25. Electronic image document 24 is transmitted to another party, which may be the document originator, with a communication application such as by email or facsimile transmission, for example. Electronic image document 24 is then transformed by image processing 27 to produce electronic text document 28, which can be authentication against electronic text document 22, either directly or with the use of one or more authentication signatures, for example.

In the above example, documents are transferred between different parties through electronic communication applications such as email or facsimile transmission. However, transmission need not take place to realize the advantages of the present invention. For example, electronic text document 22 can be transformed into electronic image document 24 or hard copy document 26 by imaging 21 and printing 23, respectively, at a single given location. Electronic text document 22 or an authentication signature associated with electronic text document 22 is stored for later use for verification purposes. Electronic image document 24 or hard copy document 26 may be transformed to electronic text document 28 at any given later time, at which point a verification process can take place. The verification process can take place based on comparison of electronic text documents 22 and 28, or comparison of signatures generated from electronic text documents 22 and 28. All of the above operations can take place within a single given location without the need to transmit any of electronic text document 22, electronic image document 24 or hard copy document 26.

An indicator or key may be placed within electronic text document 22 to indicate whether a transformation has taken place. For example, electronic text document 22 may be provided to a recipient, who then returns an untransformed copy of electronic text document 22 to the originator. If a recipient transforms electronic text document 22 as indicated above, the indicator within electronic text document 22 will not match that of electronic text document 28, thereby providing a mechanism for determining whether an electronic text document returned to the originator is a transformed or original version.

Figure 2:
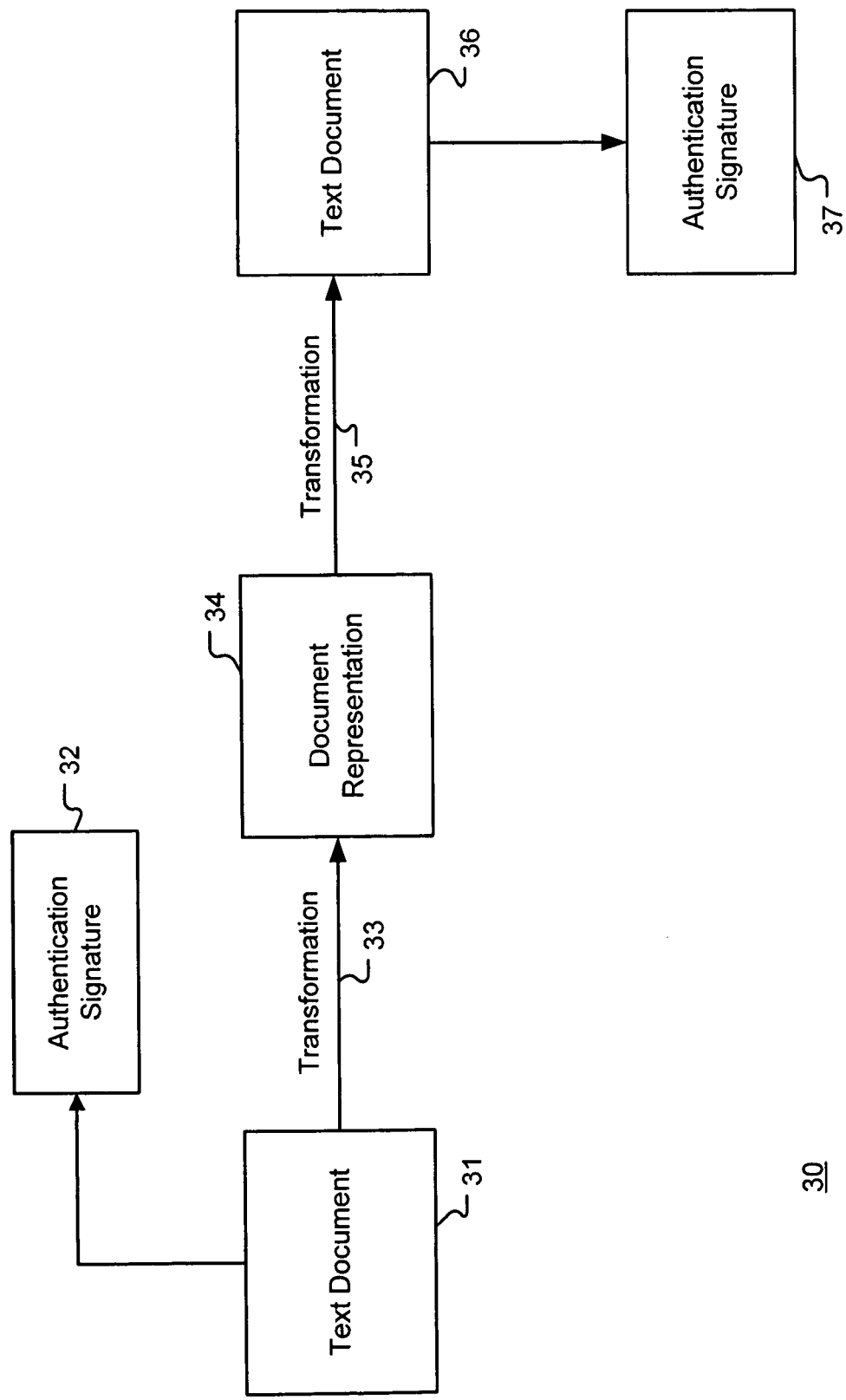
FIG. 2 is a block diagram illustrating authentication signature generation and document transformation.

Referring now to FIG. 2, a flow diagram 30 illustrates a transformation and authentication process. The process begins with an electronic text document 31. An authentication signature 32 is generated for text document 31. Text document 31 undergoes a transformation 33 to produce a transformed document representation 34 of text document 31. Document representation 34 represents one or more possible transformations, as described above with respect to FIG. 1. For example, transformation 33 may include imaging 21 or printing 23, so that document representation 34 is an electronic image document or a hard copy document. In addition, although not specifically illustrated in FIG. 2, document representation 34 may form the result of a secondary transformation, such as illustrated in FIG. 1 with paths 25 and 29 where a hard copy document is scanned or digitized and where an electronic image document is printed, respectively. Accordingly, FIG. 2 represents one or more exemplary embodiments, with a simplified embodiment being a single transformation 33 to produce document representation 34, followed by a second transformation 35 that produces an electronic text document 36.

One example of a simplified transformation process illustrated by diagram 30 is a facsimile transmission between a sending facsimile device and a receiving facsimile device. Text document 31 may be transformed with transformation 33 to an image document in document representation 34, followed by facsimile transmission. Document representation 34 may be a TIFF image document suitable for facsimile transmission, for example. The facsimile transmission may take place between facsimile devices that have imaging equipment, so that the recipient receives an electronic image from the receiving facsimile device. The image representation can be stored or transmitted in other media and then transformed at a later time through transformation 35 to text document 36. In each case where one or more transformations of a text document may occur, the final transformation to a text document such as text document 36 occurs as a transformation from an electronic image document representation to an electronic text document, illustrated by transformation 35. Accordingly, numerous transformations from the original of text document 31 may take place in accordance with the present invention, with a final transformation being made to produce text document 36. Transformation 35 may be achieved according to a number of different techniques, as discussed in greater detail below.

Once text document 36 is formed, authentication signature 37 may be generated. The verification of the contents of text document 36 with text document 31 may be achieved according to several different techniques. Text document 36 may be directly compared to text document 31 to verify that the documents match. Such a comparison may be made on the basis of discrete portions of text documents A and B, such as on a byte-by-byte or word-by-word basis. The comparison may be done on selected portions of text documents A and B, especially where portions of documents A or B may be intentionally modified.

Alternately, or in addition, authentication signature 32 may be compared against authentication signature 37. If authentication signatures 32 and 37 are used to verify the authenticity of text document 36, an original version of text documents 31 or 36 is not required. That is, once authentication signatures 32 and 37 are generated, they can be stored and compared at a later time to verify that text documents 31 and 36 do not differ in the content of interest independent of the presence of text documents 31 or 36. For verification purposes, it is possible to store only the authentication signatures 32 or 37 rather that storing an entire electronic document. For example, the authentication signatures can potentially be orders of magnitude smaller than the size of the corresponding electronic documents. The ability to store authentication signatures for verification purposes is useful in the event that storage is limited, as may be the case with such devices as facsimile machines.

As another alternate or additional feature, authentication signature 32 may be appended to or otherwise accompany text document 31. Text document 31 may be transformed to text document 36 while authentication signature 32 may be transformed or remain substantially unaffected by transformations 33 and 35. A computation performed on text document 36 to produce an authentication signature may be used to obtain a direct comparison with authentication signature 32, as the authentication signature is being generated. Accordingly, an automatic protocol is permitted in which a user can compare authentication signature 32 without generating authentication signature 37. That is, the protocol compares authentication signature elements with authentication signature 32 as the elements are generated.

As another alternative or addition, the authentication signature may be formed as text, image or coded data. Authentication signature 32 can be formed to transform with text document 31, such as by being transformed from an electronic text format to an electronic image format or a hard copy format. The authentication signature may then be retransformed to a text format, for example, to be read by a machine to contribute to verifying transformed text document 36. Because machines are capable of reading and interpreting text, image or coded data, authentication signature 32 need not be transformed. That is, the authentication signature can be generated as an image and appended to text document 31, or embedded in text document 31, for example. As text document 31 is transformed with transformation 33, authentication signature 32 does not transform, but instead is carried through the transformation process to again appear as an image in text document 36. The image is machine-readable, for example, so that a machine can regenerate authentication signature 37 from text document 36 to compare with the authentication signature image provided with text document 31. Examples of authentication signature images include barcodes that encode the authentication signature calculated from text document 31. In this example, a barcode is formed as an image that does not transform even when it is placed into electronic image form or hard copy form in transformation 33. Transformation 35 simply passes on the authentication signature image while transforming document representation 34 to text document 36.

Authentication signatures 32 and 37 may be provided in the form of a separate page that can be appended to or associated with respective text documents 31 and 36. The separate page may carry a portion, an entirety, or more than one authentication signature. In addition, one or more pages may be provided that are associated with either of text documents 31 and 36. The number of separate pages containing authentication signatures may result from a number of document transformations, transmissions, modifications or any event that may usefully initiate the generation of one or more pages containing authentication signature(s).

Referring now to FIG. 3a, a flow diagram 140 illustrates a comparison of two authentication signatures A and B. Authentication signatures A and B are derived from electronic text documents, one being an original, and another having been transformed two or more times. A block 141 indicates the comparison of authentication signatures A and B to determine if the authentication signatures match. A decision block 142 provides an indication of whether a document match is determined. A match between the documents is verified by comparing authentication signatures A and B. If authentication signatures A and B match, then the documents are considered to match and verification is complete. If authentication signatures A and B do not match, decision block 142 so indicates and the documents represented by authentication signatures A and B are considered different and verification has failed, as indicated in block 144. If it is determined that authentication signatures A and B do not match, and the corresponding text documents are not verified against each other as in block 144, there may be a number of reasons why. For example, the content of the transformed text document may have been modified. The transformation processes may be noisy or lossy, resulting in an imperfectly transformed text document. In any case, when a comparison results in a lack of verification, the documents are not automatically confirmed as matching. If the original documents are available, a manual inspection may be carried out to determine if the document portions of interest differ between the original and transformed versions. When the comparison results in verification, the documents may be automatically confirmed as matching. That is, the transformation, optional transmission, and verification of documents can occur without having to manually intervene.

Referring now to FIG. 3b, a flow diagram 145 illustrates verification of transformed documents by direct comparison of the text documents A and B, as shown in block 146. Decision block 147 determines if the compared documents match, and indicates that the match is verified in block 148, or not verified in block 149. As discussed above with respect to authentication signatures, a lack of verification between the documents may stem from a number of reasons, and indicates that automatic verification is not available.

The authentication signature generated from text document A or B may be computed in accordance with a number of different techniques. In one exemplary embodiment, the authentication signature is generated as a checksum. Many types of algorithms may be used to generate the checksum such as, for example, algorithms that utilize a Cyclic Redundancy Code (CRC) that can be of different lengths. The probability of detecting a random error using a CRC checksum algorithm is $1-\frac{1}{2^n}$ where n is the length of the CRC generator polynomial. For a 32-bit checksum, the probability of detecting a random error is 99.9999%.

Many other types of techniques for creating an authentication signature may be used. The goal of the authentication signature is to provide a high probability that the authentication signature cannot be duplicated if the underlying content from which the authentication signature is calculated is modified. The authentication signature may be selected in dependence upon the content of the document so that the authentication signature is more robust. For example, the authentication signature can be tailored to a text document containing mostly alphanumeric characters, to decrease the probability that the authentication signature can be duplicated while the underlying text document content is modified.

The authentication signature for the text document may be generated based on the entire contents of the document, a portion of the document, or selected sections of the document. For example, an authentication signature can be generated for each page, each paragraph or any particular region of the document. Generation of the authentication signature can purposely omit portions of the document, such as, for example, margins, a hand signature area and portions that are meant to be intentionally modified. An example of an intentionally modified portion of a document is the addition of an identifying line on a facsimile transmission, such as one that includes an indicator of a source, time, date, facsimile numbers and so forth.

In accordance with another exemplary embodiment, the presently disclosed system and method provides verification for a facsimile transmission. The types of documents available for transmission by facsimile include images or portions of images derived from electronic text documents and image documents generated by imaging electronic text documents or scanning paper documents. The transmitted document can be abbreviated, truncated, condensed, expanded or appended to before, during or after transmission.

While the present invention is not limited to verification of transmitted documents, facsimile transmission verification presents a unique application readily available for realizing the present invention. With facsimile transmission systems, a sender transmits a facsimile, or an electronic image of an original text document. The original document can be an electronic text document or a paper document scanned by the facsimile device to form the electronic image. The facsimile transmitted document in electronic form can be stored or saved by one or more of a sender or receiver as an electronic image document for use in later authentication. Verification of the transmitted document content can be achieved by comparison with an original electronic text document or authentication signature. Verification can also be achieved based on the image document resulting from the transformation of the original electronic text document. The image document is simply transformed to an electronic text document using image processing techniques. An authentication signature may then be generated from the resulting electronic text document. In this situation, an original electronic text document or authentication signature need not be maintained in storage.

With the authentication signature being generated from a text document that is transformed from an image representation, a number of types of verification of facsimile transmission can be achieved. For example, the sender may wish to verify that the received facsimile document is not altered after receipt. In addition, the sender or receiver may wish to verify that the received facsimile was sent from the sender's facsimile device. The system and method of the present disclosure also addresses the converse situation, where a facsimile receiver may wish to prove to the sender that a received facsimile is unaltered. Some instances where these issues are readily applicable include facsimile transmitted orders, contracts, agreements, publication services and so forth.

Figure 4A:
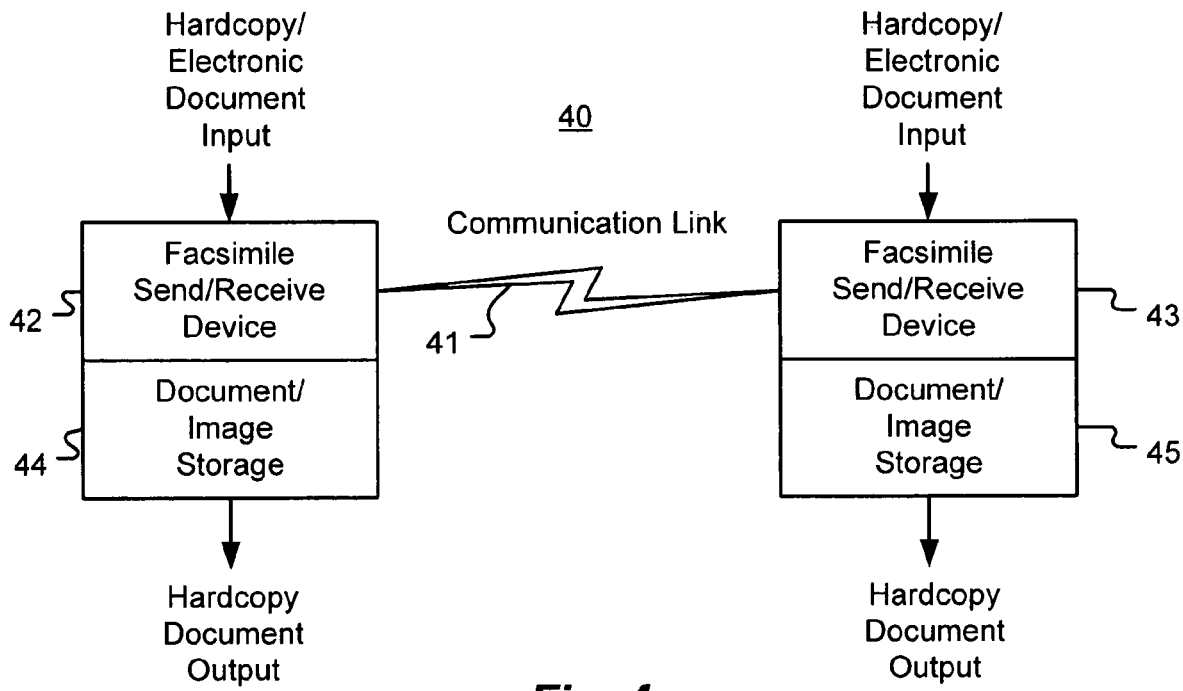
FIGS. 4a and 4b are block diagrams of a facsimile transmission system with authentication in accordance with the present disclosure.

Referring now to FIG. 4a, a diagram of a facsimile communication system 40 is illustrated. System 40 includes two complimentary facsimile devices 42 and 43 for sending and receiving facsimile documents over a communication link 41. Communication link 41 may be formed through any typical physical media used for communication, including wireless, fiber optic, traditional telephone lines or combinations of any different types of media for communication. Devices 42 and 43 may also form components in a traditional telephone network, a local area network (LAN) or a wide area network (WAN), so that they can send or receive facsimile documents within a network of electronic devices. For example, device 42 as part of a LAN may receive instructions from an electronic device within the LAN to transmit an electronic form document from the electronic device to facsimile device 43, or an electronic device coupled to facsimile device 43.

Devices 42 and 43 may communicate with a number of types of protocols that may depend upon characteristics of the communication link, such as the physical media used or the connectivity for the communication link. A common example of a communication link that may have many different types of physical media is a switched network. Switched networks may take the form of a Public Switched Telephone Network (PSTN) or a digital packet switched network, such as an Internet Protocol (IP) network. A switched network may have a number or different types of physical media that the user, or devices 42 and 43, may take advantage of, such as wireless, fiber optic cables, coaxial cabling, twisted pair(s) and so forth. Devices 42 and 43 typically have protocols for connecting to the network through the available physical media. In addition to the physical media protocol, devices 42 and 43 have a transport or communication protocol for establishing a communication link and sending or receiving information over the communication link. Various protocols available for devices 42 and 43 may take advantage of analog telephone lines, digital telephone lines and switching networks such as PSTN or IP networks. For example, devices 42 and 43 may communicate over an analog telephone line and conform to group 2 or group 3 communication standards including International Telecommunication Union, Telecommunication Standardization Sector (ITU-T) recommendations T.30, T.3 or T.4. In the case of digital telephone lines, devices 42 and 43 may communicate with group 4 standards, such as ITU-T recommendations T.6, T.62, T.503, T.563 or T.611, among others.

In the case of a switched network such as an IP network, facsimile devices 42 and 43 may communicate on a real-time or store-and-forward basis. A real-time basis typically takes advantage of voice over IP (VoIP) to send an audio stream over an IP network. VoIP protocols such as SIP (Session Initiation Protocol), IAX (Inter-Asterisk Exchange) and H.323 based on ITU-T recommendations may be used. In this type of environment, a codec typically converts the audio stream to a digital form for VoIP. One such protocol that provides for real-time Facsimile over IP (FoIP) is the ITU-T T.38 standard for real-time mode messages based on a User Datagram Protocol (UDP) or Transmission Control Protocol/Internet Protocol (TCP/IP). The real-time mode T.38 IP based facsimile service or protocol maps the T.30 facsimile protocol onto an IP network. The T.38 service uses two protocols, one for UDP packets and another one for TCP packets. The T.38 service supports VoIP protocols such as SIP, IAX and H.323 for transmitting a facsimile data stream over a switched network.

In a store-and-forward mode, devices 42 and 43 communicate through FoIP gateways that store and forward facsimile data. Each FoIP gateway stores an image of the transmitted facsimile data and sends the data using a transport mechanism to another FoIP gateway where the image is decoded and available for a receiver. Some examples of transport mechanism protocols are Simple Mail Transfer Protocol (SMTP) and ITU-T T.37 for store and forward FoIP. This type of mode is similar to that used by email messages.

Facsimile devices 42 and 43 include storage components 44 and 45, respectively, that are capable of storing text or image documents that are to be transformed and transmitted or that have been received and potentially transformed by the corresponding facsimile device. Storage 44 and 45 may be composed of memory components to store information for such purposes including record keeping, backup or compliance with regulatory requirements. For example, storage 44 and 45 may keep a record of every facsimile that is sent or received on respective facsimile devices 42 and 43. Facsimile devices 42 and 43 also permit scanning of hard copy documents to transform paper document to image document. The image documents may be stored in storage 44 and 45 for later transmission or printing by facsimile devices 42 and 43. In this way, facsimile devices 42 and 43 may have many different applications, including document scanning and image storage, as well as document or image transmission or reception. Facsimile devices 42 and 43 also include software and/or hardware for controlling document storage or retrieval and facsimile transmission and reception. Printing of an image document by facsimile devices 42 and 43 represents another transformation, and may occur after transmission of the image document.

According to one aspect of the present disclosure, one or more of storage 44 and 45 are add-on components to devices 42 or 43. Storage 44 or 45 may be expandable for additional memory or storage, and may provide additional functionality. For example, storage 44 and 45 may be composed of components that sense or observe information sent or received on communication link 41. In such a capacity, storage 44 and 45 performs functions such as converting information from an analog communication link to a digital form for storage or generation of an authentication signature. The add-on component may operate in parallel with devices 42 and 43, or may be incorporated into the operating capacity of devices 42 and 43. By providing a sensing and recording add-on component to devices 42 and 43, existing equipment using analog technology, for example, can be made compliant with document retention regulatory requirements or other information retention policies, such as corporate policies.

For real-time facsimile transmissions, facsimile devices 42 and 43 typically establish a communication channel over communication link 41 with established communication protocols to exchange information for facsimile communication. For example, facsimile device 42 may initiate a call over a packet switched network, such as an IP network, by initiating a session with SIP support, as discussed above, to establish a communication link with facsimile device 43. The session initiation may include invitations and acknowledgements for participation in the call over a packet switched network. Typically, the session initiation involves a proxy server that transmits IP messages between the sender and receiver with SIP support. Various messages may be transferred between sender and receiver during the session initiation. For example, facsimile device 42 may query facsimile device 43 for parameters of transmission, such as operating speed, capacity, type of transmission protocol in use, and so forth. Facsimile device 43 may provide facsimile communication information to facsimile device 42, as well as pose information queries for parameters related to facsimile transmission. One or more proxy servers may store some or all of the parameter information. Typically, once facsimile devices 42 and 43 have negotiated common parameters and protocols, transmission of the facsimile information commences.

SIP support provides for different modes of encryption that may be used to send messages from a sender to a receiver through a proxy server. For example, SIP support permits end-to-end encryption of the SIP message body and certain sensitive header fields. Hop-by-hop encryption prevents an eavesdropper from tracking who is calling whom and hop-by-hop encryption of VIA fields hides the route a request has taken. In addition, SIP support provides authentication using HTTP basic and digest schemes, which can provide rudimentary authentication for a source of a request. PGP authentication is also available in the SIP support model so that a sender can be authenticated based on information relayed within each of the packets. Accordingly, while SIP support provides encryption and authentication support for the transmission packets, there is no supported functionality for authentication of the overall message or document being sent.

An exemplary embodiment of the disclosed system and method provides software and/or hardware to instruct facsimile devices 42 and 43 to generate authentication signatures based on an electronic text document. The text document may be formed by image processing an electronic image document that is a transformed representation of a text or paper document. Authentication signatures may be generated at only one of devices 42 and 43, both, or in conjunction with each other, such as by transmitting machine-readable text representations between devices 42 and 43, for example. Also, the authentication signature may be in the form of symbols that are incorporated into an image document suitable for transmission by facsimile. The symbols may be located in an unused portion of the document, such as a margin, for example. In the case of original electronic documents, the authentication signature may also be embedded in the document itself, such as with nonprintable or non-displayed codes. In such an instance, the document can be configured to be "self-authenticating," where the authentication signature in the document is used to verify the text document content itself. An embedded authentication signature may also be used to indicate when a document has been transformed, since the embedded authentication signature can be configured to be lost in the transformation. In such an instance, a document originator can readily determine whether a returned electronic document is a copy of an original, or a transformed version of an original. Authentication signatures may be encrypted for security purposes or to provide validation for the identity of a source of information.

In an exemplary embodiment, facsimile device 42 may generate an authentication signature based on a text document content that is derived from an original text document or an electronic or print image that is transformed to a text document. The text document content may be drawn from a transmission over communication link 41 in the form of an image document transformed to a text document. The authentication signature may be in the form of a page that is appended to the original document or a facsimile document, as referred to herein as a "signature page." The signature page includes information related to the content of the document, which is codified using an established computation for use in later verification. The signature page may be generated solely at facsimile device 42 and made available to the sender locally as a verification tool.

Alternately, or in addition, the signature page may be transmitted to facsimile device 43 by itself or along with the transmitted facsimile document so that the receiver has a copy of the signature page as well. Furthermore, facsimile device 43 as a receiving device may also generate a signature page based on the content of the received facsimile document, following transformation to a text document. The receiver facsimile device generated signature page may be provided to the receiver for verification purposes, or can be returned to the sender, such as by being transmitted through communication link 41 to facsimile device 42 for further verification testing purposes. The signature page can be in any type of format, such as text or image. If the signature page is to be processed automatically, the format should be machine-readable, through image processing or transformation, as examples. In any case, facsimile devices 42 and 43 are capable of generating signature pages and transmitting signature pages, based on the content of electronic documents that can be drawn from storage 44 and 45 or from a hard copy document input.

Communication link 41 can be a real time dedicated point-to-point link, such as an analog telephone line, a digital telephone line, a PSTN connection or a VoIP or FoIP link. In such a case, verification of the transmission content can easily be obtained in accordance with the disclosed system and method through the generation of an authentication signature at the sender, the receiver, or both. In a store-and-forward mode, an authentication signature can be generated for each link in the transmission sequence. For example, a transmitted image from a sender to a first intermediary receiver may include a first signature page. As the image is forwarded from the first intermediary to a second intermediary receiver, another signature page can be generated and appended to the transmission. Accordingly, various points in the transmission sequence may add a signature page that verifies document content at given points. A final destination receiver may receive a number of signature pages that represent the number of forwarding entities, including the sender, that generate signature pages over the path that the facsimile transmission has traveled. Each point through which the transmission passes need not produce a signature page. Each signature page can be verified against the document content to show that the content is unaltered at each point in the transmission process. If a signature page fails a verification test, the point at which the failing signature page originates can be examined for document content modification issues.

In addition, or alternately, a single signature page may be transmitted with the image document transmission, and various intermediary receivers in the transmission sequence may verify the signature page to provide an indication that the transmitted document is unaltered. In such a configuration, the ultimate receiver receives the image document transmission and a single signature page. In this configuration, intermediaries may re-verify the image document content based on the received signature page and a document transformation, and regenerate a signature page for transmission to the next forwarding point in the communication link. The original sender may be provided with a copy of the ultimate signature page to verify receipt of the transmission and the content of the delivered image document. The ultimate receiver of the image document transmission also can verify the identity of the original sender when that information is included in the transmitted signature page(s).

The signature page or other added information to an image document transmission for authentication purposes can include source and destination information, time and date information or control information, for example. Control information may be used to indicate how the authentication signature is to be processed. For example, the authentication signature may include more information than that strictly related to document content. The control information can instruct a machine tasked with processing an image document on how authentication signatures can be generated or verified, or how document content can be verified.

Figure 4B:
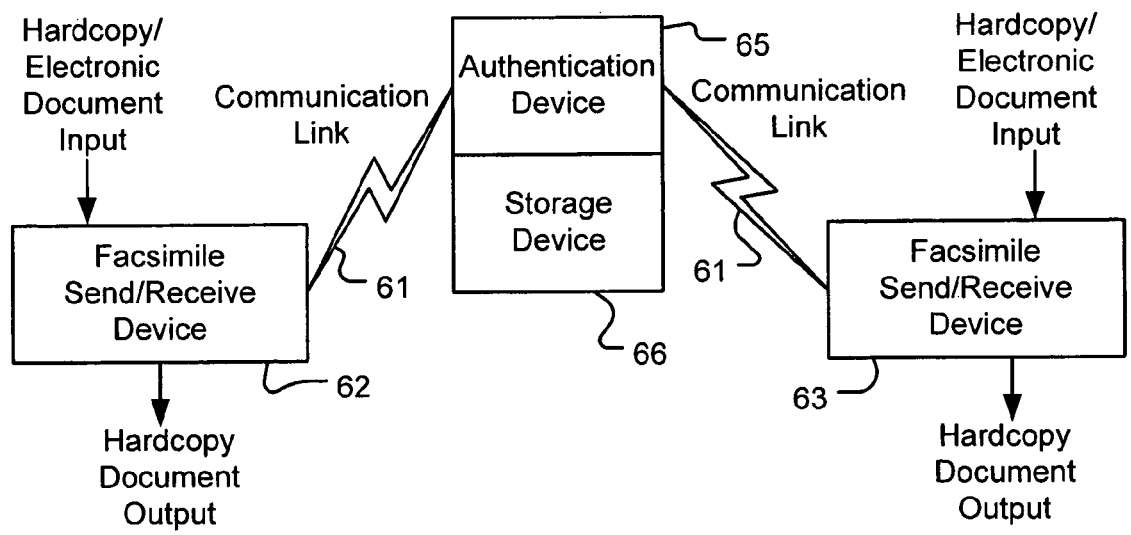

According to another embodiment illustrated in FIG. 4B, a facsimile communication system 60 is illustrated. System 60 includes facsimile devices 62 and 63 that send and receive facsimile documents using a communication link 61. Facsimile devices 62 and 63 operate similarly to facsimile devices 42 and 43 and a reference is made to the above description.

In the embodiment shown in system 60, an authentication device 65 communicates with facsimile devices 62 and 63 and provides authentication functions for information transmitted between facsimile devices 62 and 63. For example, authentication device 65 generates a signature page that includes coded information derived from a document transmission between facsimile devices 62 and 63. Authentication device 65 may also include an authentication signature on a portion of a transmitted document, for example, such as in an unused portion of the document such as a margin. An authentication signature may also be embedded in a document with authentication device 65. In such an instance, the embedded authentication signature may be invisible to an individual viewing the image, such as may be the case with nonprintable or non-displayed codes placed in the electronic image representation to provide the authentication signature for the document text content. An authentication signature in a form such as a signature page or a copy of the transmitted information with an added authentication signature can be stored in a storage device 66. The signature page or authentication signature can be transmitted to facsimile devices 62 or 63, either as a result of transmission of information on communication link 61 or as retrieved from storage device 66. Facsimile devices 62 and 63 may also include storage components (not shown) for storing electronic information or documents. Facsimile devices 62 and 63 may also transmit and receive documents or information that are electronic in original form. In such a case, a document content authentication signature may also be stored in electronic form. Alternately, or in addition, facsimile transmitted information may originate as a hard copy document that is transformed to an electronic image document with facsimile devices 62 and 63. Hard copy documents may be transformed and sent or received using scanners or printers, for example, in facsimile devices 62 and 63.

Figure 5:
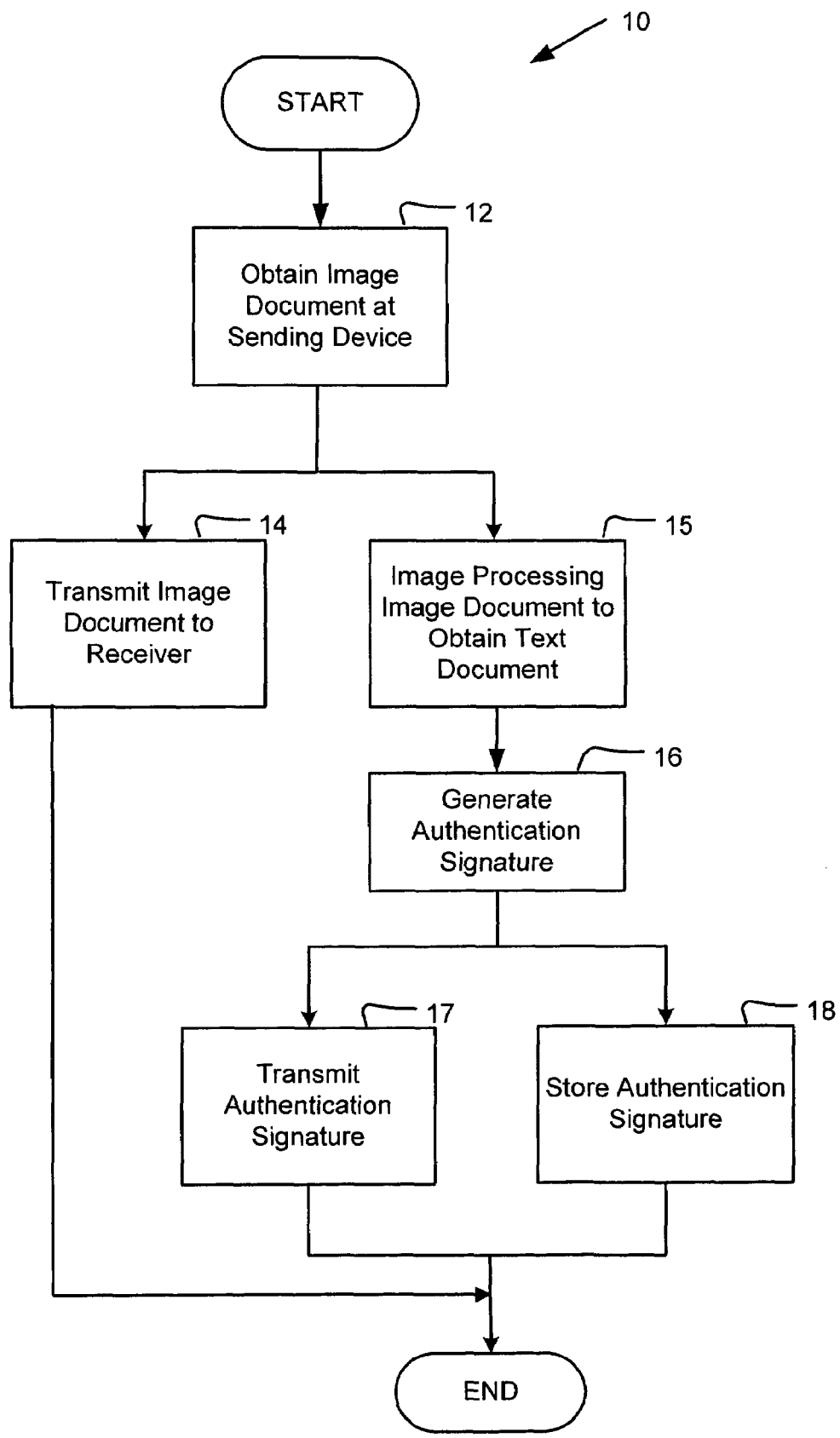
FIG. 5 is a simple flow chart illustrating an authentication signature generated from an image document at a sending device.

Referring now to FIG. 5, a flow chart 10 illustrates a process for generating an authentication signature at a sending facsimile transmission device. In block 12, an image document is obtained. The source of the image document may be a hard copy document scanned and transformed into an electronic image document. The image document may be obtained by imaging an electronic text document. An image document can be stored in memory that is local to the facsimile device. Once an image document is obtained, it can optionally be transmitted to a receiving facsimile device, as indicated in block 14.

It should be apparent that an image document already in electronic form might be used as the facsimile source for a transmission. For example, text documents produced using a word processor, or image documents such as PDF or TIFF documents may be used as the facsimile source document. A word processor program may include embedded software to convert a text document to an image document for transmission by a facsimile device. The word processor may include software to directly send a text document over a network coupled facsimile device for example, after conversion of the text document to suitable form, such as PDF or TIFF.

With a stored image document available, an image processing operation is engaged to process the image document to obtain an electronic text document, as indicated in block 15. Once an electronic text document is available, an authentication signature can be generated, as indicated in block 16. Image processing in block 15 may produce a text document according to a number of different techniques, including the use of Optical Character Recognition (OCR). Authentication signature generation in block 16 can also be brought about with a number of different techniques, including the use of one or more checksums for all or portions of the text document. The authentication signature may be generated in the form of a signature page as well.

Once an authentication signature is generated in block 16, the authentication signature may optionally be transmitted with the sending facsimile device in block 17. With this option, the authentication signature may be transmitted with an image document, or by itself, to the receiving facsimile device. Alternately, or in addition, the authentication signature may be stored in memory as indicated in block 18.

Figure 6:
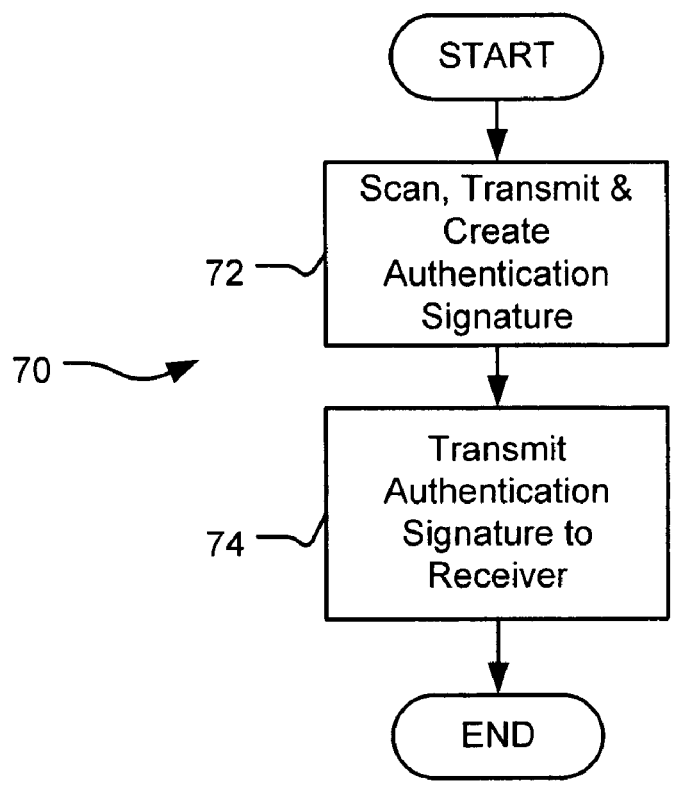
FIG. 6 is a flow chart illustrating the transmission of previously generated authentication information.

Referring now to FIG. 6, a flow chart 70 illustrates an operational scenario of the present disclosure where authentication information is transmitted to a receiver in addition to a facsimile document. Authentication information may include sender and/or receiver specific information included in an authentication signature. Sender and/or receiver specific information may include telephone numbers, IP addresses, identifying codes, time and date stamps, and the like. Block 72 illustrates the operations of obtaining and transmitting an image document and creating an authentication signature from a text document resulting from transforming an image document. As discussed above, the image document may be obtained by scanning a paper document or imaging a text document. Block 74 illustrates the operation of transmitting the authentication signature to the receiver. The authentication signature can be represented in the form a signature page that is appended to the document transmission. The receiver receives the transmitted document and the appended signature page that can be used for verification of the sent document.

Figure 7:
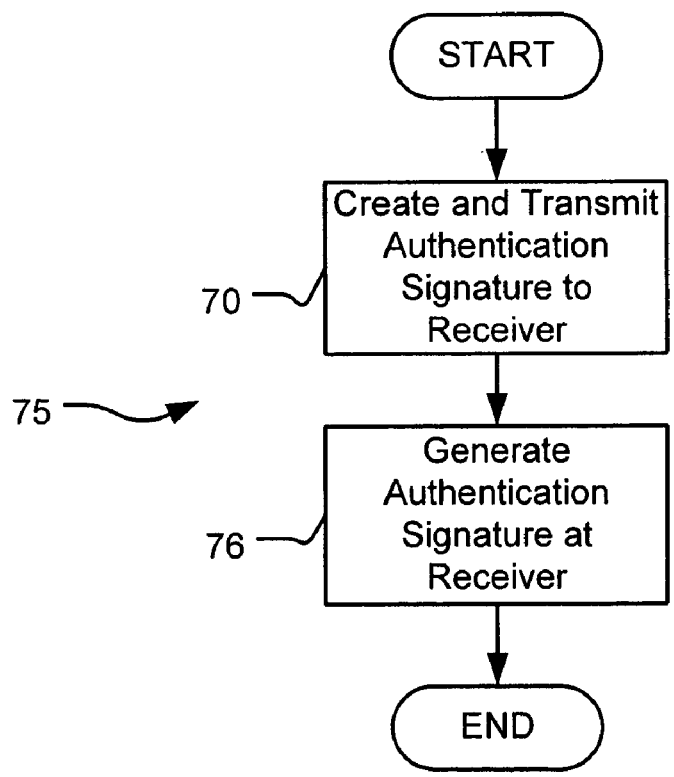
FIG. 7 is a flow chart illustrating generation of authentication information at a receiving device.

Referring now to FIG. 7, a flow chart 75 illustrates another exemplary embodiment of the disclosed system and method. Flow chart 75 includes block 70 that represents the creation and transmission of authentication information to a receiver, as shown in FIG. 6. A block 76 illustrates the operation of generating authentication information at the receiver. The authentication information in block 76 may be in the form of a signature page generated at the receiving facsimile device based on the transformed content of the facsimile document. The signature page may be presented to the receiver, or may be returned to the sender for verification of the transmission. If a signature page was sent from the sending device along with the facsimile document, the receiving device can generate a signature page that includes the information related to the signature page from the sender. That is, the sender signature page or authentication information may form part of the content for generating the signature page at the receiver. As illustrated in FIG. 4B, authentication information may be generated by a third party with authentication device 65, and the authentication information can be stored, or transferred between facsimile devices 62 and 63. In this way, transmissions between facsimile devices 62 and 63 can be authenticated, for example by having the facsimile devices echo back the information and/or signature page, which can be verified at authentication device 65.

The above-described variations for generating authentication information produce signature pages, for example, based on the occurrence of various events. A signature page may be generated for a sender upon transmission of a facsimile document. A signature page may be generated for a receiver upon reception of a facsimile document. A sender or receiver may transmit or cause a signature page to be transmitted to their counterpart with the transmission or acknowledgement of a facsimile document.

The signature page itself need not be an entire document page, but can consist of a code or set of symbols that provide an electronically generated authentication signature based on content of the transformed facsimile document or text document. The authentication signature can be attached to a portion of the facsimile document itself, in an area not used to generate the authentication signature, such as reserved space or margins, for instance. The authentication signature may also be embedded in the document so that it is not visible in the image itself, as may be achieved with the use of nonprintable or non-displayable codes in the electronic image representation. Such an embedded authentication signature may permit the document to be "self-authenticating," where the authentication signature in the document is used to verify the document itself. An embedded authentication signature may also be used to indicate when a document has been transformed, since the embedded authentication signature can be configured to be lost in the transformation. In such an instance, a document originator can readily determine whether a returned electronic document is a copy of an original, or a transformed version of an original. The signature page can also represent verification information for collective portions of the transmitted facsimile document. For example, authentication signatures can be generated on a region-by-region basis, such as by defining portions of a document page for which separate authentication signatures are generated. The authentication information then represents a number of portions of a text document page. Accordingly, one or more authentication signatures can be generated for a single text document.

When a document is authenticated on a region-by-region basis, a number of advantages for certain applications are available. For example, when a text document is authenticated on a region-by-region basis, any change to a region can be indicated, and a region that changes can be identified. One instance in which region-by-region authentication proves useful is for execution of contracts or agreements in which a receiver provides indicia of assent, such as, for example, a biometric signature or Personal Identification Code (PIC). In this example application, a sender may present a complete contract to the receiver over a facsimile communication link. The receiver may supply the execution indicia for agreement or approval of the facsimile document and return the same to the sender. The execution indicia may take on a number of forms, including coded passwords, biometric signatures based on hand signatures, thumbprints, and other verifiable indicia of binding personal consent. The biometric signature or PIC may be an image of a hand signature, for example. In any case, the biometric signature or PIC occupies a certain region of the transmitted document image that can be excluded from authentication processing. The region-by-region authentication works to validate the content and source of the returned document to assure the sender that no content of the contract has changed, except for the region in which the biometric signature or PIC is applied by the receiver.

Another technique that accommodates a contract transmission application is to avoid authenticating a region having indicia of execution. The region can be reserved as a page or a portion of a page of the transmitted document image. The document with the execution indicia returned to the sender can then be transformed to a text document and an authentication signature generated and matched against an original or an authentication signature generated at the sending facsimile device. Information included with the authentication signature can be used to identify and authenticate a facsimile source and to verify the parties while confirming that no changes were made to the contract provisions.

One exemplary technique for authenticating regions or text documents in their entirety is through the use of encryption. For example, the content of a text document can be used in the encoding of an encrypted, electronically generated authentication signature that is highly tamper resistant for later verification.

Figure 8:
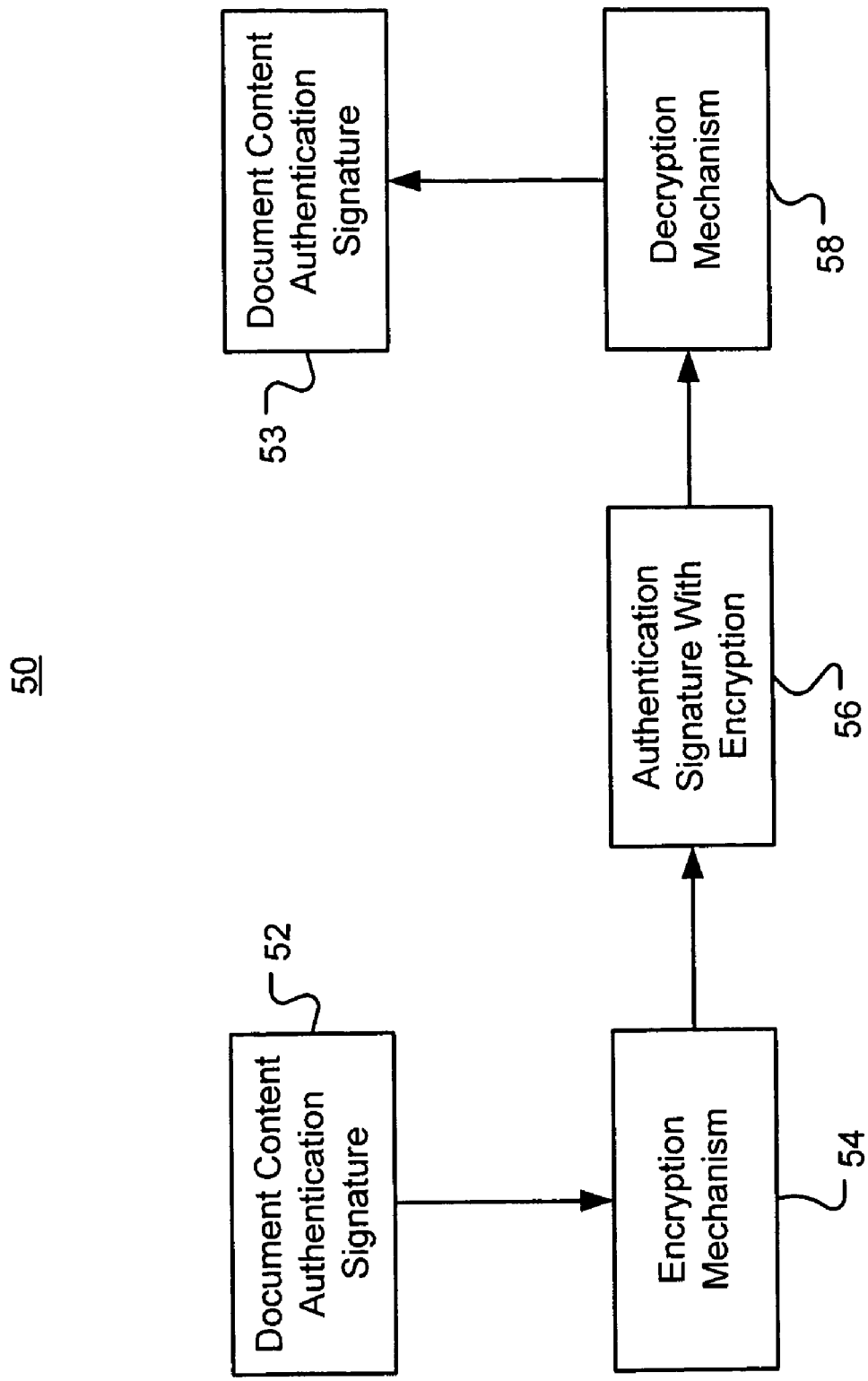
FIG. 8 is a block diagram of an encryption process in accordance with the present disclosure.

Referring to FIG. 8, a process 50 is illustrated for protecting the electronically generated document authentication signature with encryption. An authentication signature 52 is derived from a content of a text document. Authentication signature 52 is encrypted with encryption mechanism 54 to produce an encrypted authentication signature 56. One example of an encryption mechanism 54 is a private/public key pair mechanism. For example, an originator can encrypt authentication signature 52 with a private key to produce encrypted authentication signature 56. A decryption mechanism 58 uses a public key to decrypt encrypted authentication signature 56 to produce an authentication signature 53. This private/public key pair encryption is designed to work with a single entity possessing the private key, such that encrypted authentication signature 56 is generated from authentication signature 52 at a single, verifiable source. Any entity that receives encrypted authentication signature 56 may access a public key to decrypt the authentication signature with decryption mechanism 58 to obtain authentication signature 53. Accordingly, a recipient of the original document can verify that authentication signature 52 originated with the possessor of the private key, and can verify the text document content with decrypted authentication signature 53. The same private/public key encryption mechanism may be used by the recipient or another party to again encrypt a received or regenerated authentication signature to provide verification of source and content of an accompanying text document. This verification ability also provides a non-repudiation feature, where the originator cannot deny the document source or content.

Figure 9:
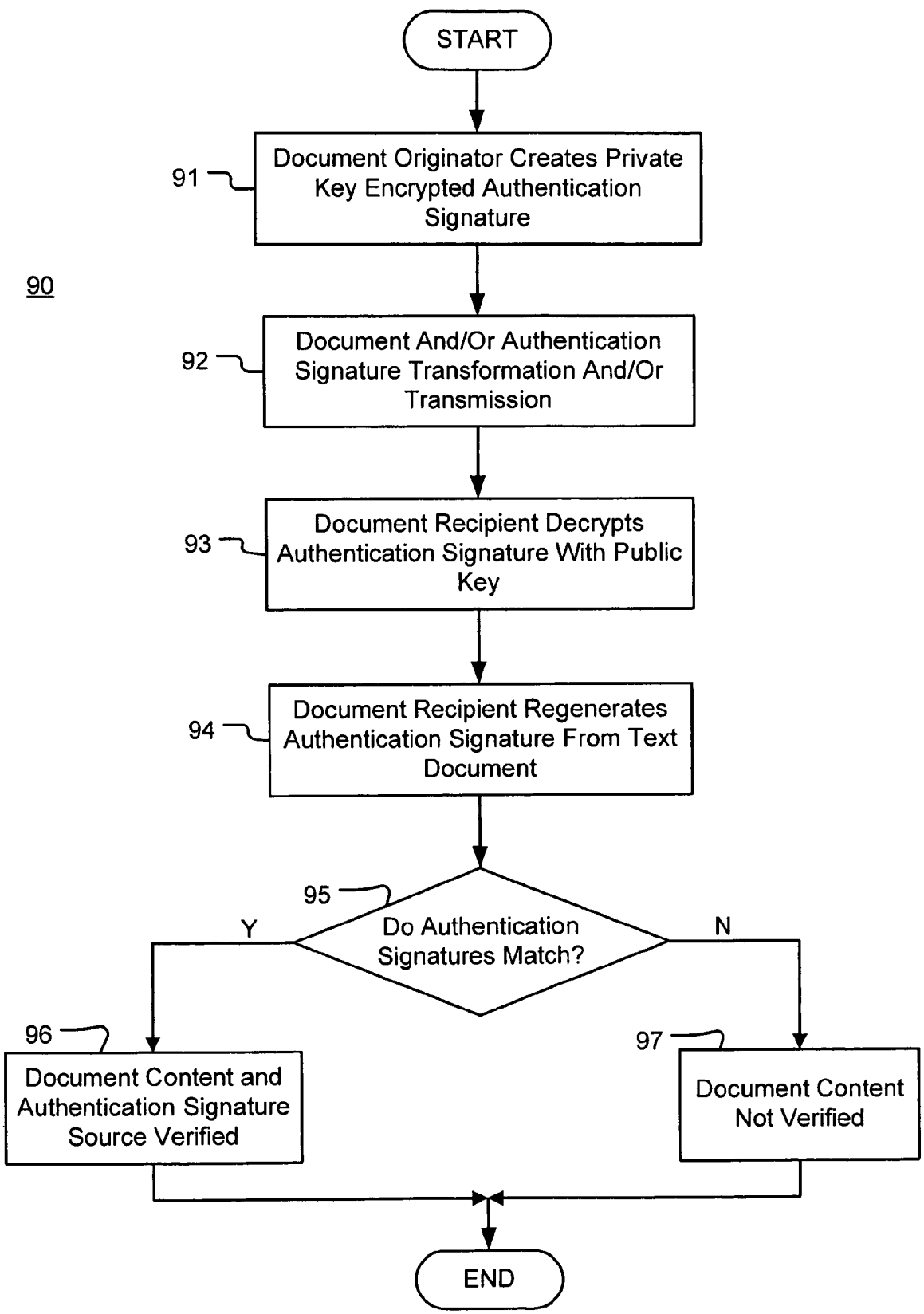
FIG. 9 is a flow chart illustrating comparison of private/public key pair encrypted authentication signatures.

Referring for a moment to FIG. 9, a flow diagram 90 illustrates a process for comparing private/public key pair encrypted authentication signatures. In block 91, the document originator creates a private key encrypted authentication signature. The private key is part of a private/public key pair, where the private key is possessed by a limited number of parties, such as the document originator alone, for example. In block 92, the document and/or the authentication signature derived from the document are transformed and potentially transferred to a document recipient. In the exemplary embodiment illustrated in flow chart 90, the text document or transformed document may also be encrypted with a private or shared secret key, and need not necessarily be accompanied by the authentication signature. In block 93, the document recipient decrypts the authentication signature with a public key. If the document itself is encrypted with a private or shared secret key, such as a read only key, the document recipient may also decrypt the transformed document. In block 94, the document recipient in possession of either the decrypted document, decrypted authentication signature or both regenerates an authentication signature from the transformed text document.

In an exemplary embodiment, the regenerated authentication signature may be provided to the document originator for verification purposes or may be stored by the document recipient for later verification. In either case, a decision block 95 indicates a comparison of the authentication signatures to verify document content. If the authentication signatures match, block 96 indicates that the document content and authentication signature source are verified. That is, by decrypting the document and/or authentication signature and comparing the original authentication signature with a regenerated authentication signature, a party can verify that the content of the document is not modified, and that the document originator was the source of the encrypted document and/or original authentication signature. If decision block 95 indicates that the authentication signatures do not match, block 97 indicates that the document content is unverified, that is, the document content was modified or the encrypted document and/or authentication signature came from a source other than the document originator. Accordingly, process 90 illustrates how document content and document or authentication signature source can be verified with private/public key pair encryption.

As an alternative, or in addition to the above private/public key pair encryption usage, a document recipient can send a public key of a private/public key pair to a document originator to encrypt the document and/or authentication signature, either or both of which are then provided to the document recipient. The document recipient, or a designated party, is presumed to be the sole possessor of the matching private key. Accordingly, only the document recipient, or designated party, can decrypt the document and/or authentication signature. The document recipient may also generate an authentication signature, which can be encrypted with the recipient's private key and returned to the document originator for verification purposes. Any of the previously described transformation processes involving a document or authentication signature are applicable for the encryption mechanisms described above with respect to a private/public key pair. In addition, or alternately, a shared secret key may be used among a limited number of trusted parties to secure a document or authentication signature.

Another example of an encryption mechanism 54 is PGP (Pretty Good Privacy), which can be used to encrypt messages, typically between a sender and receiver, based on private/public key pairs. In this context, messages refer generally to information transferred between a sender and receiver, including facsimile information transferred over a store-and-forward type communication system, for example. PGP encryption provides message privacy through message encryption during transmission of the information. That is, the body of the message itself is encrypted, typically with a public key provided by a requester so that the requester receiving the encrypted message can decode it with a private key corresponding to the previously sent public key. However, there is no assurance to the recipient of the request that the received request or response came from the stated party, such as may be determined with a from field of a message header, for example. A typical advantage of PGP encryption is that proxy or intermediate transmission points are unable to modify the request or response. If the relevant fields in an SIP request or response are not encrypted, it is also possible for an eavesdropper to see who is corresponding with whom, such as by examining the to and from fields. Encryption of these address fields can be achieved using PGP, but may cause some intermediate points or proxies to return an unauthorized message, for example, if a missing entry in the from field is required.

Decryption mechanism 58 may be employed at a later time or date to decrypt encrypted authentication signature 56. For example, encrypted authentication signature 56 may be stored with an originator or other parties that may wish to validate a text document content. Storage may take place with any type of storage media, including tape, disk, chip or other long or short term, fixed or removable memory storage. Encrypted authentication storage 56 can be transmitted and stored at a sending device, a receiving device or an intermediary, at the same time as transmission of a text document from which it is derived, or at a later time. Encrypted authentication signature 56 can be decrypted to verify authentication signatures 52 and 53 at a later time than that at which the document transmission occurs. Accordingly, encrypted authentication signature 56 or authentication signatures 52 and 53 may be stored and verified at any given time, such as after the transmission of the corresponding document takes place.

As indicated above, once an encrypted authentication signature 56 is generated, verification of authentication signature 52 can be obtained by applying decryption mechanism 58 to obtain authentication signature 53. With the verification process, authentication signature 52 should match authentication signature 53 to verify that the text document content is unaltered.

Various parameters related to the facsimile transmission of information may be incorporated into authentication information that can include an authentication signature. For example, a facsimile transmission often begins with an exchange of information between the sender and receiver. Exchanged information may include public keys, time and date information, available protocols, party identifiers, such as names and/or facsimile telephone numbers, and so forth. Some of the exchanged information can be incorporated into the facsimile transmitted information, such as in a margin area to associate the transited information with a sender and time and date, for example. Any of these types of parameters may be used in the generation of authentication information that is used to form a signature page that also includes authentication information that can be incorporated into or associated with a facsimile transmitted document. The parameters that are available for incorporation in authentication information may vary depending upon the type of system. For example, IP addresses may be used in a real-time or a store-and-forward type system over a switched IP packet network. In general, the authentication information includes additional information about the document from which the included authentication signature is derived. For example, the authentication information contributes to identifying a sender and receiver and unique characteristics related to a facsimile transmission to uniquely identify the message. The authentication signature verifies the content of the text document transmitted as a transformed image document, while the remaining authentication information verifies items such as the parties' relative time and date, and so forth.

Process 50 describes a technique for creating an encrypted authentication signature by a document originator or recipient. The document originator or recipient can verify the document content based on one or more decrypted authentication signatures or one or more regenerated authentication signatures. Verification is provided by comparison of an originator document authentication signature and a recipient document authentication signature. The encrypted authentication signature may accompany a document from which it is derived, or may be generated from a transformed document, or both.

Another example of an encryption technique that may be used in process 50 involves a symmetric or shared secret key that is known to a limited number of parties, such as a document originator and a document recipient. The shared secret key is useful for encrypting an entire document and/or authentication signature to secure the document and/or authentication signature among trusted parties. As long as the shared secret key remains known only to the trusted parties, any one of the trusted parties is assured that the document and/or signature page originated from one of the other trusted parties. The shared secret key encryption may be used in any of the above-described configurations for transforming a document and transferring or generating an authentication signature to verify document content.

In addition, the shared secret key encryption may be used in instances where a document originator seeks to prevent or permit a document recipient from forming an authentication signature for a document. For example, a document may be furnished to a recipient in an encrypted form, which the recipient can decrypt with the shared secret key to obtain a read-only or print-only version of the document. The recipient can still regenerate an authentication signature using the transformed read-only or print-only version of the document, and the regenerated authentication signature can be encrypted by the recipient with the shared secret key or a recipient private key to provide a secure verification tool that may be stored for later usage.

As another example of an application for a shared secret key, a document recipient, with an appropriate shared secret key, may be permitted to modify a text document, which may be returned to the originator with or without a new authentication signature that can be in an encrypted form using the shared secret key. The modifications made by the document recipient may be in the form of a redline, where the originator can readily review the document modifications. Alternately, or in addition, the originator can compare the original document with the modified document to determine the changes made to the original document by the document recipient. The document originator then has the option of regenerating an authentication signature for the returned, modified document where the modifications are removed to determine whether the regenerated authentication signature matches the original authentication signature. In this way, the originator can verify that the purported changes to the document are the only ones made. Similarly, the originator can generate an authentication signature for the modifications to the document, or the entire modified document to provide a verification tool for the modifications in the returned document made by the document recipient.

As another example of an application for a shared secret key, a document originator may provide a transformed document to a document recipient, with or without an original authentication signature that is encrypted with a shared secret key. The document recipient is permitted to print the document and modify it without changing content from which an authentication signature would be derived, such as by providing a hand signature. The signed document can be provided to the document originator with or without an encrypted authentication signature generated by the document recipient or signatory. The document originator can compare an original authentication signature with one generated by the document recipient or signatory to verify the document contents. Alternately, or in addition, the document originator can regenerate an authentication signature from the hand-signed document for comparison with the original authentication signature. In any of the above-described applications or configurations, a shared secret key encryption can facilitate the security of a document or authentication signature among a limited number of parties for limited purposes related to the disclosed system and method.

Process 50 may be applied at a stand-alone computer, a sending device that generates a local encrypted signature page, or can be applied as part of a transmission process where an encrypted signature page is generated and optionally delivered to a receiving device and decrypted for validation. In addition, process 50 may be applied for two-way validation, where an encrypted signature page is provided from one party to another. The second party generates its own encrypted signature page based on the content of the underlying text document and other parameters, which may include the encrypted signature page from the first party. Both encrypted signature pages are then provided to the first party. In this way, both the first and the second party have verification information related to acknowledgement of receipt and content of the text document.

An exemplary application for the above described verification technique involves sending and receiving facsimile devices. The two facsimile devices, as part of the authentication information, exchange tokens encoded with the public or private keys of each device. For example, a sending device provides a token that includes local time and other parameters related to the sending device that is encrypted with a private key of the sending device or a public key of the receiving device. The receiving device creates a token with similar characteristics encrypted with the receiving device private key or a public key from the sending device. In an exemplary embodiment, the encryption may be performed by a third party at a remote location. The sending device sends its token to the receiving device as part of initiating a communication. The receiving device then sends both tokens back to the sender, where they are inserted into a signature page along with the authentication signature. The signature page can be maintained by the sender, delivered to the receiver with the facsimile document, or both, or be maintained by a third party. With the exchange of the tokens, the receiver cannot repudiate or deny receipt of the facsimile document at the receiving device. Accordingly, the token exchange contributes to verifying the identity of the sender and the receiver, and the time that each believes the transaction occurred.

Various techniques may be used for forming an authentication signature based on the content of a transformed text document with the system and method of the present disclosure. One exemplary technique is to treat the text document as a stream of data and provide a coded checksum of the stream of data. A number of different checksum calculations are available, and may be made application specific, as is known. The authentication signature may be coded in machine-readable format, which may include text that is converted into symbol values through OCR. Coding can also include standard barcodes, two-dimensional barcodes such as matrix or stacked barcodes, alphanumeric or other symbols. The authentication signature represented in the coding may be encrypted, which encryption may include a private key, for example. One advantage to using machine-readable codes, such as barcodes or text readable through OCR, is the ability of a scanning device, such as a facsimile device, to read and decode the authentication information, which may include control instructions. As discussed above, the authentication signature computation may proceed by region, by being performed on portions of a page of a text document, for example. A machine-readable code may be provided on a signature page for each authentication signature computed for each region of the text document. Regions may be defined as an entire document, a single page, portions of a page, or a single portion of a single page, for example, a line of text. Regions may also be exclusive of portions of a document, such as pages where the margins are excluded from checksum computation.

Validation of text documents according to the disclosed system and method can proceed based on comparison of two text documents or based on comparison two authentication signatures. When the two text documents are stored in electronic format, as discussed above with regard to storage 44 and 45 in FIG. 4*a*, the documents can be compared directly, such as by comparing discrete bytes or text words. The authentication signatures can be regenerated from the text documents and should match exactly. Alternately, a stored authentication signature can be compared against a generated authentication signature derived from a document that is to be authenticated against an original text document. The text document from which the authentication signature is derived may be the result of one or more transformations of the original text document, such as by printing, imaging or image processing. However, the authentication signature derived from the resulting text document should exactly match the authentication signature of the original text document.

When a hard copy document is scanned to create an electronic image document, the scanning process introduces noise that diminishing the ability of the image processing operation to reconstruct the original text of the hard copy document or the original text document upon which the hard copy document is based. Accordingly, reconstruction of an authentication signature from the scanned hard copy document presents a technical challenge. In accordance with an exemplary embodiment of the disclosed system and method, the scanning process for hard copy documents has an increased precision or granularity to produce a higher quality image document. Increasing the precision or granularity of a scanning operation is typically available on commercial scanners and facsimile machines that may be operated in accordance with the present invention.

According to one exemplary embodiment, a number of authentication signatures are computed for a given text document, with each authentication signature representing a portion of the document. When the authentication signatures are compared to authentication signatures generated from a transformed text document, any mismatches can help to target and identify portions of the two text documents that do not match. Accordingly, if an authentication process cannot be done completely automatically, any particular mismatches can be identified to contribute to speeding a manual examination process.

Image processing to convert an image document to a text document may incorporate one or more techniques that contribute to producing accurate text output. OCR is one image processing technique that specifically converts image data from an image document to alphanumeric characters to produce a text document. Typically, OCR algorithms operate by separating image areas representative of alphanumeric characters from background regions. Various algorithms taking advantage of special arrangements of alphanumeric characters contribute to separating the characters from the image information. Prior knowledge about the alphanumeric characters, such as font, character size and formatting can contribute to improving OCR algorithms.

In accordance with an exemplary embodiment of the presently disclosed system and method, the output of the OCR algorithm is a 100% match of the original text, so that comparison between text documents or authentication signatures produces a 100% match when compared with each other. The 100% match between text documents or authentication signatures forms a basis for conducting authentication automatically, without manual intervention. In the event of less than a 100% match, other types of document inspection or comparison, including manual examination may be used to identify portions of the document that have been modified, or were incorrectly interpreted by the OCR algorithm due to items such as noise, distortion or stray markings, for example.

The use of OCR can help detect small changes in document content that may not readily observed in a manual examination, but may nonetheless be highly important. For example, if a number 9 were replaced by a 6 in a text document, the change may be difficult to detect manually. The use of OCR in converting an image document to a text document would more easily detect such a modification between an original and a transformed document. The modification is easily distinguished using OCR since the OCR converted character code, such as an ASCII code for a 9, is significantly different from that of a 6. An authentication signature generated from a text document with a small modification is significantly different from the authentication signature generated from the original text document. With the authentication signature technique, small modifications in the text document produce large changes in document or authentication signature comparisons, and cause the automatic verification process to fail with a high degree of accuracy. The verification process can optionally indicate a location where the text documents or authentication signatures do not match to focus the application of other document inspection techniques or a manual examination.

Many other types of image processing techniques may be used separately or in conjunction with OCR to transform an image document to a text document. Some examples include image processing for correction of skew or rotation of an image document. Other image processing functions such as edge detection, sharpening, flyspeck identification and so forth may be applied to condition the image document for improved OCR operation.

The disclosed system and method may be applied in a number of situations in which verification of text documents is desired. One exemplary application involves certification of facsimile transmitted documents. In this exemplary application, a facsimile server provides facsimile documents to a requester automatically, or upon being prompted. The facsimile transmitted document is certified as to authenticity, origination point and time, as well as content. Authentication information generated for the document may include all of the above information, including an authentication signature that represents a computation conducted on the text content of the document. The receiver of the facsimile transmitted document can verify the contents of the document based on the authentication signature, as well as verifying the source, time and authenticity of the document with the authentication information. The authentication information can also be in an encrypted form to provide further verification of the source and improve the security of the validation.

Another application for the disclosed system and method involves a facsimile service to verify information, such as time and date, for a given event. In this exemplary application, a sender transmits a text document through a facsimile device to the verification service, where a receiving device generates an authentication signature and authentication information for each received facsimile document. The received document is transmitted back to the sender with the authentication information, such as a signature page that contains the authentication information with the authentication signature. In this way, the facsimile service certifies the authenticity of the document, the origination source and time and date of the document receipt. This application illustrates the advantages of the disclosed system and method over known systems in which acknowledgement of a sent facsimile document is in the form of a simple yes or no. With the inventive system and method, the sender is provided with verification of receipt of the entire document, along with verifiable indicia of acknowledgment of receipt. The returned authentication information may be encrypted to improve the security of the application, as well as contribute to identifying the facsimile service.

Another example of an application that takes advantage of the disclosed system and method concerns verification of contract documents transformed for hand signature. If an originating party provides a contract to a recipient party, the originating party may wish to verify that the hand signed contract has the same content as the original contract document. The contract can be provided in any of the document representations discussed above, such as text, image, print and so forth. The contract need not be transmitted for the present invention to apply. Alternately, or in addition, the contract can be transmitted by post, email, facsimile, storage media, electronic links such as in a network, and so forth.

The recipient party alters the contract document to provide manifestation of assent, such as by applying a hand signature. The hand signature is a deliberate and desirable alteration of the document, but represents a modification to the original document content. In this instance, verification of document content is achieved by providing authentication signatures for regions of the contract document, so that a hand signature area, for example, may be excluded from the verification analysis. Such a solution may provide a predefined hand signature area, for example, such as a 3-by-5 inch space 1 inch above a bottom edge of a sheet of paper. This predefined area may include text that is not included in the authentication signature calculation, so that any deliberate alterations in this area do not impact the authentication signature. The remaining portions of the contract document as transformed to a text document are analyzed with their authentication signatures to verify the content of the executed contract document. A variation of this technique provides for a separate hand signature page that is omitted from verification analysis. The remainder of the document may then be analyzed to produce an authentication signature that is suitable for verification of the text document content.

The presently disclosed system and method may be adapted as an archival and storage system that permits regulatory compliance with applicable rules and regulations for a given industry, for example. A given industry may have a regulatory requirement for certain filings or document storage for a given period of time, as well as proof of compliance with such regulations. The disclosed system and method provide a means for satisfying document storage requirements, while providing authentication information for compliance with regulatory requirements. The stored data and records of regulatory compliance can be encrypted according to the present invention, so that evidentiary proof of compliance is secure, tamper-free, and uniquely identifies the compliant entity. As a variation of the above-described regulatory compliance system and method, a third party repository can take advantage of the disclosed system and method to act as a clearinghouse for a number of industries while avoiding conflicts due to the secure nature of the record keeping and authentication that may be used to limit access to the preserved information.

A further application for the disclosed system and method concerns verification of receipt of an order. A service generates an authentication signature based on the content of a text document that results from a transformation. The authentication signature can be provided on a signature page that contains other authentication information related to the transformed document, which can represent an order transmitted by facsimile, for example. The authentication information may include a time and date stamp, and may optionally be signed with the private key of the facsimile service. The facsimile document and/or signature page is returned to the sender, by any available means, including post mail, email and facsimile transmission. The sender may then use the corresponding public key to validate the time of receipt of the order at the intended facsimile device or service.

A number of issues related to realizing the system and method according to the present disclosure are contemplated as being within the scope of the disclosure. Examples of related issues include processes or techniques to accommodate different transmission methods, such as different message encoding, protocols, facsimile services or devices, as well as rotation or skew of an image document, page, or portion of a page. The present disclosure contemplates techniques for addressing noise introduced in a scanning operation, including obstructions to scanning an image, such as dirt or other obscuring material, the introduction of lines on a page or document in any orientation or warping of the scanned document or pages. In addition, the present disclosure contemplates addressing changes in document scale, such as may occur with different protocols or facsimile devices having different size paper, original documents having predetermined formatting, such as being bound in a book or magazine, hole punches, staples or the like.

It will further be appreciated by those of ordinary skill in the art that modifications to and variations of the above-described disclosure may be made without departing from the inventive concepts disclosed herein. Accordingly, the invention should not be viewed as limited except as by the scope and spirit of the appended claims.

What is claimed is:

1. A method for verifying matching content between a plurality of text documents implemented with a numerical computation device, comprising:
   at a first location, forming a first authentication signature from an electronic text character content of a first text document;
   obtaining a document representation that is a transformation of the first text document, where the document representation represents the electronic text characters converted to a format that is other than electronic text;
   electronically transmitting the document representation to a second location;
   electronically storing a second text document derived from the document representation;
   forming a second authentication signature from an electronic text character content of the stored second text document; and
   comparing the first and second authentication signatures.

2. The method according to claim 1, further comprising transforming an image document to form one or more of the text documents.

3. The method according to claim 1, further comprising computing a checksum from one or more of the text documents to form the first or second authentication signatures.

4. The method according to claim 1, further comprising indicating a failed verification when a result of comparing the first and second authentication signatures indicates no match.

5. The method according to claim 1, further comprising forming a plurality of authentication signatures for one or more of the text documents.

6. The method according to claim 1, further comprising forming one or more of the authentication signatures to be machine-readable.

7. The method according to claim 1, further comprising encrypting one or more of the authentication signatures.

8. The method according to claim 1, wherein comparing is performed automatically by a machine.

9. The method according to claim 1, further comprising transforming one or more of the text documents to an image document.

10. The method according to claim 1, further comprising transforming one or more of the text documents to a paper document.

11. The method according to claim 9, further comprising transforming the image document to a paper document.

12. The method according to claim 10, further comprising transforming the paper document to an image document.

13. The method according to claim 1, further comprising transmitting the document representation by facsimile.

14. The method according to claim 1, further comprising storing one or more of the authentication signatures.

15. The method according to claim 1, further comprising forming one or more of the authentication signatures with symbolic indicia.

16. The method according to claim 6, further comprising forming one or more of the authentication signatures with symbolic indicia.

17. The method according to claim 15, wherein the symbolic indicia includes alphanumeric characters.

18. The method according to claim 16, wherein the symbolic indicia includes alphanumeric characters.

19. A system for verifying matching content between a plurality of text documents, comprising:
- a storage device for storing in electronic form an authentication signature generated from electronic text characters from an electronic form of a first text document;
- a processor communicatively coupled to the storage device and being operative to access the authentication signature generated from the electronic text characters from the electronic form of the first text document and being further operative to:
- electronically obtain an image document;
- store the image document in the storage device;
- transform the image document to a second electronic text document;
- generate an authentication signature from the second electronic text document; and
- compare authentication signatures respectively generated from the first and second electronic text documents for a match.

20. The system according to claim 19, wherein the processor is further operative to generate a checksum from one or more of the electronic text documents to contribute to forming an authentication signature.

21. The system according to claim 19, further comprising an authentication signature reader communicatively coupled to the processor for reading an authentication signature in machine-readable format.

22. The system according to claim 19, wherein the processor is further operative to generate an encryption of an authentication signature.

23. The system according to claim 19, further comprising a storage device for storing one or more of the authentication signatures.

24. The method according to claim 1, further comprising transmitting the first authentication signature with the document representation.

25. The method according to claim 24, wherein the first authentication signature is transmitted with and separate from the document representation.

26. The system according to claim 19, wherein the image document is electronically received via facsimile reception.

27. The system according to claim 19, wherein the processor is operable to electronically receive the first authentication signature.

28. The system according to claim 27, wherein the first authentication signature is received with and separate from the image document.

29. A method for verifying matching content between a plurality of text documents implemented with a numerical computation device, comprising:
- electronically obtaining an image document derived from a first electronic text document;
- electronically obtaining a first authentication signature generated from the first electronic text document;
- transforming the image document to a second electronic text document;
- generating a second authentication signature from the second electronic text document; and
- determining if the first and second authentication signatures meet a match criterion.

30. The method according to claim 29, wherein obtaining includes receiving.

31. A method for verifying matching content between a plurality of text documents implemented with a numerical computation device, comprising:
- forming a first authentication signature from a first electronic text character content of a first text document;
- obtaining a first document representation that is a transformation of the first text document, wherein the first document representation represents the first electronic text character content provided in a format that is other than electronic text;
- obtaining a second document representation derived as a transformation of the first document representation, where the second document representation represents the first electronic text character content provided in a format that is other than electronic text;
- transforming the second document representation to a second text document that includes a second electronic text character content;
- forming a second authentication signature from the second electronic text character content of the second text document; and
- determining if the first and second authentication signatures meet a match criterion.

* * * * *